(12) United States Patent
Sebesta et al.

(10) Patent No.: US 8,365,304 B2
(45) Date of Patent: Jan. 29, 2013

(54) RESTRICTING ACCESS TO VOLUMES

(75) Inventors: David J. Sebesta, Redmond, WA (US);
Robert C. Elmer, Redmond, WA (US);
Jay C. Beavers, Duvall, WA (US); Jack Creasey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 12/785,495

(22) Filed: May 24, 2010

(65) Prior Publication Data

US 2011/0289596 A1    Nov. 24, 2011

(51) Int. Cl.
*G06F 21/00*    (2006.01)
(52) U.S. Cl. ............................................. 726/28; 726/27
(58) Field of Classification Search ..................... 726/16, 726/17, 26, 27, 28, 34; 713/193; 711/100, 711/115
See application file for complete search history.

(56) References Cited

U.S. PATENT DOCUMENTS

| | | | |
|---|---|---|---|
| 5,859,968 A | | 1/1999 | Brown et al. |
| 6,684,310 B2 | | 1/2004 | Anzai et al. |
| 7,519,786 B2 | | 4/2009 | Sekine et al. |
| 2004/0003262 A1* | | 1/2004 | England et al. ............... 713/189 |
| 2004/0119659 A1* | | 6/2004 | Justice et al. .................. 345/1.1 |
| 2006/0010502 A1 | | 1/2006 | Mimatsu et al. |
| 2007/0233985 A1 | | 10/2007 | Malhotra et al. |
| 2008/0103531 A1 | | 5/2008 | Ginggen et al. |
| 2009/0205049 A1* | | 8/2009 | Chakra et al. .................. 726/26 |
| 2010/0049993 A1 | | 2/2010 | Okaue et al. |
| 2010/0107213 A1 | | 4/2010 | Ureche et al. |
| 2012/0117247 A1* | | 5/2012 | Carruthers .................... 709/226 |

OTHER PUBLICATIONS

"How to prevent limited users from using removable disks in Vista", Retrieved at << http://www.blog.jbi.in/tipsntricks/how-to-prevent-limited-users-from-using-removable-disks-in-vista/ >>, Aug. 16, 2009.
"How to Restrict User Access to Removable Media With RBAC", Retrieved at << http://docs.sun.com/app/docs/doc/817-5093/medcdrw-17?a=view >>, Retrieved Date: May 17, 2010.

* cited by examiner

*Primary Examiner* — Edward Zee

(57) ABSTRACT

Architecture that provides programmatic association of a device (e.g., removable) to a currently logged-in user, and restricts access to the drive only to that particular logged-in user. When active, the architecture detects when devices are added to the system, determines which logged-in user a given device (or devices) should be assigned, modifies the security settings for the device(s), and makes a per-user drive letter mapping to that device such that only the logged-in user can see the mapped device. In the context of serially attachable peripheral devices such as USB (universal serial bus) devices (and IEEE 1394 devices), for example, access can be restricted to a user based on the USB hub into which the device is connected. This prevents the operating system from assigning a global drive letter to a device or device volume (for drives) when the device is added.

20 Claims, 7 Drawing Sheets

RESTRICTING ACCESS TO VOLUMES

BACKGROUND

There are scenarios where granting all users full control over all removable volumes is disadvantageous. One example of such a scenario is an environment where several users want to simultaneously use a single computer while working independently in discrete user sessions. When multiple removable volumes (e.g., two serial port flash drives and a digital camera) are attached to a computer, by default, all currently logged on users have full access to all of these volumes, thus controlled access is not allowed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides programmatic association of a volume (e.g., removable, non-removable) to a currently logged-in user, and restricts access to the volume only to that particular logged-in user. When active, the architecture detects when devices are added to the system, determines which logged-in user a given volume (or volumes) should be assigned, modifies the security settings for the device(s) associated with the volume(s), and makes the volume available to only that user.

In the context of serially attachable peripheral devices such as USB (universal serial bus) devices and IEEE 1394 devices, for example, access can be restricted to a user based on the USB hub (for USB devices) into which the device (volume) is connected. This prevents the operating system from mounting the device or device volume (for drives) when the device is added. The architecture can also apply to short range wireless networks such as personal area network (PAN) devices such as cameras, and so on.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
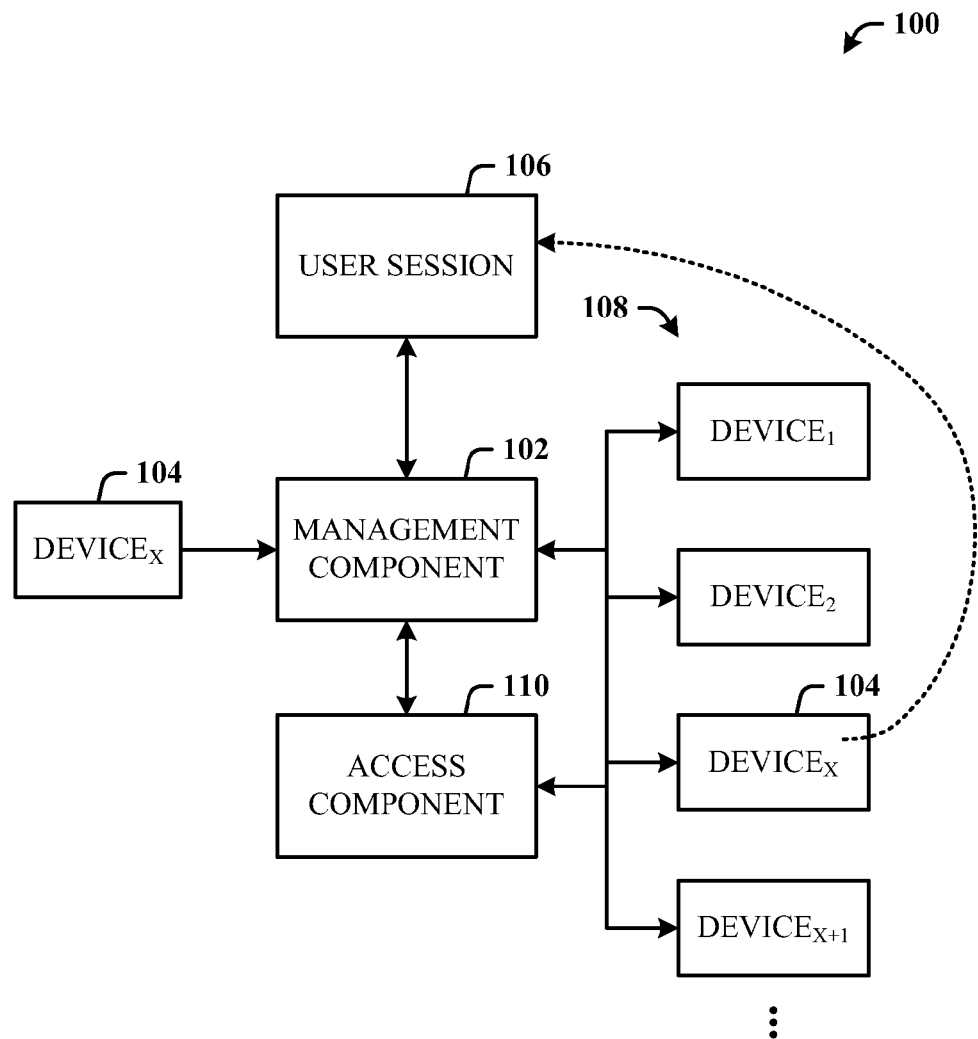
FIG. 1 illustrates a computer-implemented device management system in accordance with the disclosed architecture.

The disclosed architecture provides device management by assigning a volume to a logged-in user and thereby restricting access to the volume to only that user. The management applies to removable drives (e.g., flash, floppy, optical, hard disk, etc.), and other peripheral devices as well. Software is provided that detects when a device (e.g., removable volume) is added to the system, which user the volume is assigned to, modifies the security settings for the volume, and mounts the volume such that only that user can see the mounted volume. It is to be understood that the term "volume" is intended to mean any a single accessible storage area. Thus, a single hard disk drive or flash drive can comprise a single volume, multiple volumes, be part of a volume that exceeds the single device drive storage capacity (the volume extends over multiple devices), and so on. Accordingly, as used herein, volume can mean any of the above.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented device management system 100 in accordance with the disclosed architecture. The system 100 includes a management component 102 of a multi-user system that detects install of a device 104 during a user session 106. The device 104 is mounted relative to current device mappings 108 of the multi-user system. An access component 110 restricts access to one or more volumes of the device 104 to a user of the user session 106.

The access is restricted to a single logged-in user of the session 106 during which the device 104 is connected and mounted. The device 104 can be a removable drive (e.g., flash device). The removable device can be associated with a universal serial bus (USB) device connected to the multi-user system via a USB hub. The management component 102 prevents system software from mounting the device 104 when the device 104 is installed (in the device mappings, also referred to as the device hierarchy). The management component 102 associates the volume of the device 104 with the session (user). The access component 110 restricts access to the volume based on location of the device 104 in a device hierarchy of the multi-user system.

In other words, the system 100 allows programmatic association of a removable volume (e.g., of the device 104) to a currently logged-on user (of the session 106), and restricts access to the volume to only that particular session user. When the solution is active, the architecture detects when volumes (removable and non-removable) are added to the system, determines which session the volume is to be assigned, modifies the security settings for the volume, and makes a per-session mapping to that volume such that only that session user can access that volume. The management component 102 detects connection of a device to the system, and sends a command to a session agent to mount volume(s) found on the device, for the session.

Figure 2:
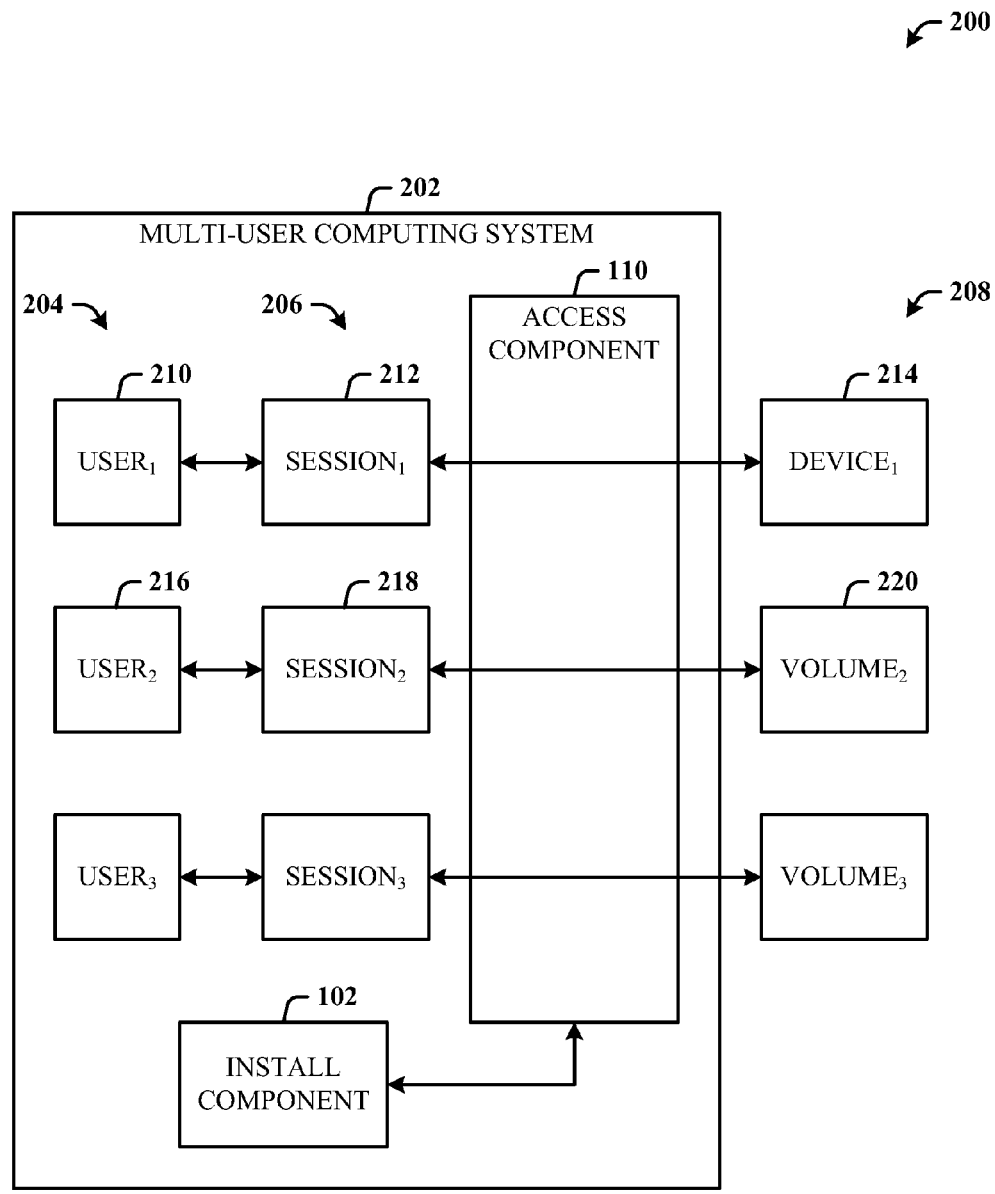
FIG. 2 illustrates an alternative embodiment of a device management system.

FIG. 2 illustrates an alternative embodiment of a device management system 200. The system 200 includes a multi-user computing system 202 that allows multiple users 204 to interact with multiple corresponding user sessions 206, each of the sessions 206 further associated with peripheral devices 208. For example, when a first user 210 logs in to a first session 212, the management component 102 and access component 110 facilitate mounting of the volume of a first device 214 to the first user session 212, and accessible only by the first user 210 of the session 212. Should the first user 212 log out, and a second user log-in to the multi-user computing system 202 and establish a second session 218, a volume 220 connected to the system 202 during this second session 218 is installed and access to the volume 220 is restricted to only the second user 216 (the first user 210 is not allowed to access the volume 220 if the second user logs off and the first user logs back in).

Note that the disclosed device management architecture operates over concurrent-use computing systems and devices where at least two users are concurrently logged in to a single system.

Note that the disclosed architecture applies as well to connecting multiple devices during an active session, such as a USB drive and an external mass storage hard drive, for example. This also applies to other peripherals such as cameras, web cams, mice, keyboards, USB devices, audio devices (e.g., microphones and headsets), IEEE 1394 devices, etc.

Figure 3:
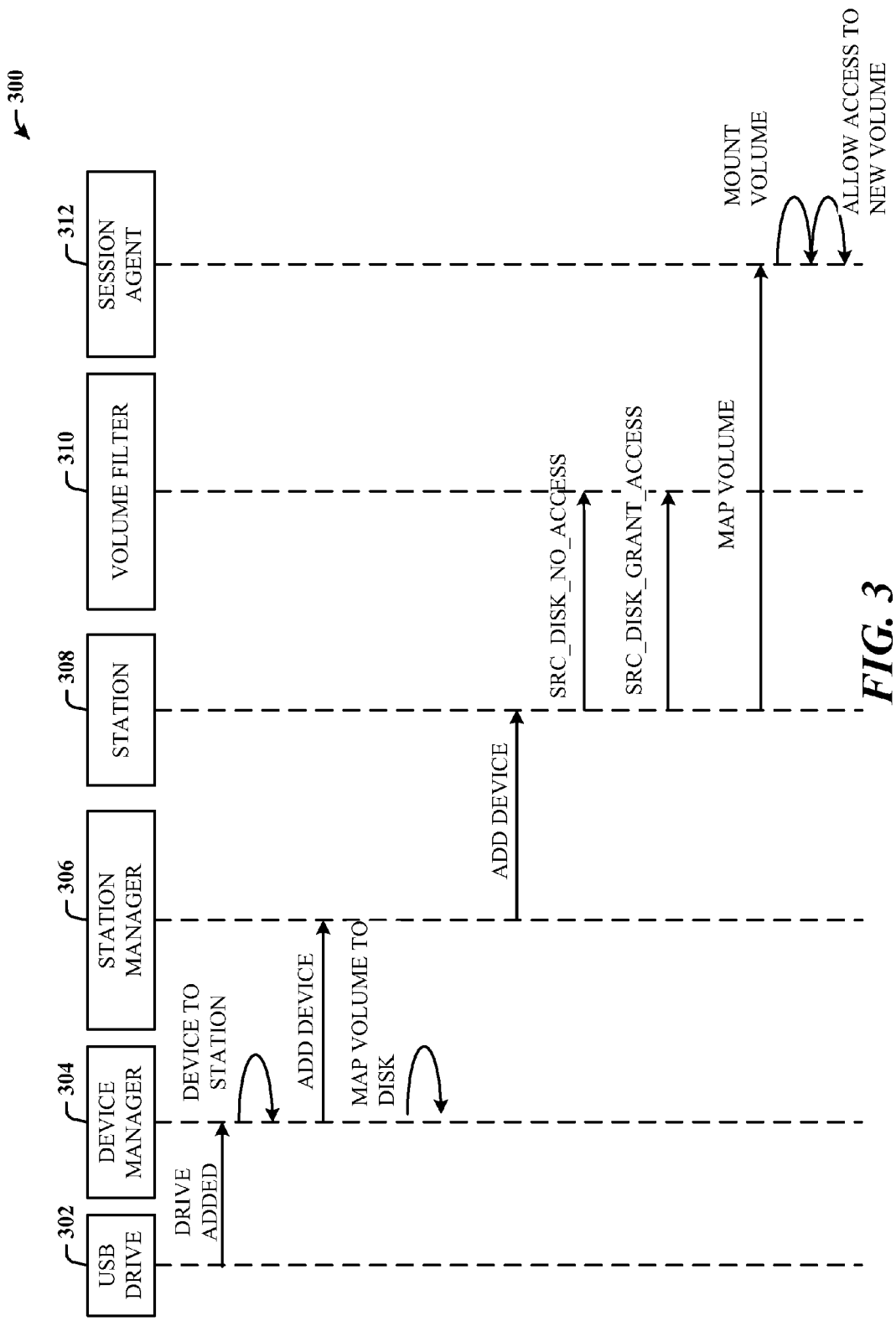
FIG. 3 illustrates a protocol diagram for adding and restricting access to a removable drive.

FIG. 3 illustrates a protocol diagram 300 for adding and restricting access to a removable drive. The protocol diagram 300 is specific to a USB device being added to multi-user system (running a Windows™ operating system by Microsoft Corporation) during a user session, but applies as well to a more general device being added to the multi-user system.

The management component 102 detects when all devices are added to the system. The management component 102 can react in different ways according to each different class of device added. When removable disk devices are added, inspection is made as to where the removable device has been inserted in the hierarchy of devices on the system, and based on this knowledge, access to that volume is restricted to a particular user (session). This restriction of access is performed at the kernel layer, thus, being applicable to any user mode application.

Consider the following specific implementation where a USB drive is attached during concurrent usage of the computing system. The system components for this protocol example are the following: a USB device 302 (the physical media which includes a removable volume); however, the device 302 can be other devices such as a digital camera, for example; a device manager 304, which is a user mode component that detects devices being added to the system and determines to which stations the device should be mapped; a utility user mode station manager component 306; a station object 308, which is a user mode component that represents the combination of a remote desktop services (by Microsoft Corporation) session, a user, and a USB hub with some devices plugged into it; an upper level class filter 310 for the volume setup class is used to modify access control lists (ACLs) to certain volumes based on input/output controls (IOCTLs) received from the utility user mode station manager component 306; and, a session agent 312 (denoted SessionAgent), which is an agent running in the user's remote desktop session.

A filter driver for the volume setup class is installed as part of the disclosed architecture. When the removable USB drive 302 is connected to the computer, this connect is detected by the device manager 304 (e.g., the management component 102). The filter driver receives a callback when a new volume is added to the system. If this volume meets certain implementation-specific criteria deemed to be manageable by this system, then the driver creates a physical device object (PDO); otherwise, the driver removes itself from the stack for that device. The station manager component 306 detects, locates, and opens these PDOs. This provides a communications channel between the station manager 306 and the volume filter 310, over which various commands are sent.

When a volume (e.g., USB drive 302) is detected on a disk physically plugged into the system, the device manager 304 receives a notification (represented by Drive Added) via a device change message (e.g., WM_DEVICECHANGE—notifies the operating system of a change in hardware configuration of a device or the computer). The device manager 304 determines where in the computer device hierarchy the new disk is located, by inspecting the device's DEVINST property, and how the USB drive 302 fits into the tree of installed devices (DEVINSTs) present on the computer. Using this information, the device manager 304 assigns the USB drive 302 to the station manager 306.

The device manager 304 also receives notifications as new volumes are discovered on the disk. For each newly added volume, a command is sent to the PDO to restrict access solely to administrators and system, and to prevent the assignment of a system-wide drive letter (mount point) visible to all sessions. It is then mapped to a disk object containing it by querying the disk number for each extent of clusters that make up the volume, then enumerating disks to find the matching disk number. With this mapping obtained, volume objects are added to the disk object which contains them. The disk object, in turn, adds each volume to the station with which the disk is associated.

The class filter 310 is signaled to grant access only to the specified user, local administrators, and local system. The class filter 310 accomplishes this via the DDIs (device driver interfaces) for creating ACLs and looking up a unique user identifier. This enables restricting access only to the correct user. The station object 308 then retrieves the device path from the device. The station object 308 sends the device path to the session agent 312 over a virtual channel (e.g., remote desktop services). The session agent 312 then mounts the volume and allows access to the mounted volume.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
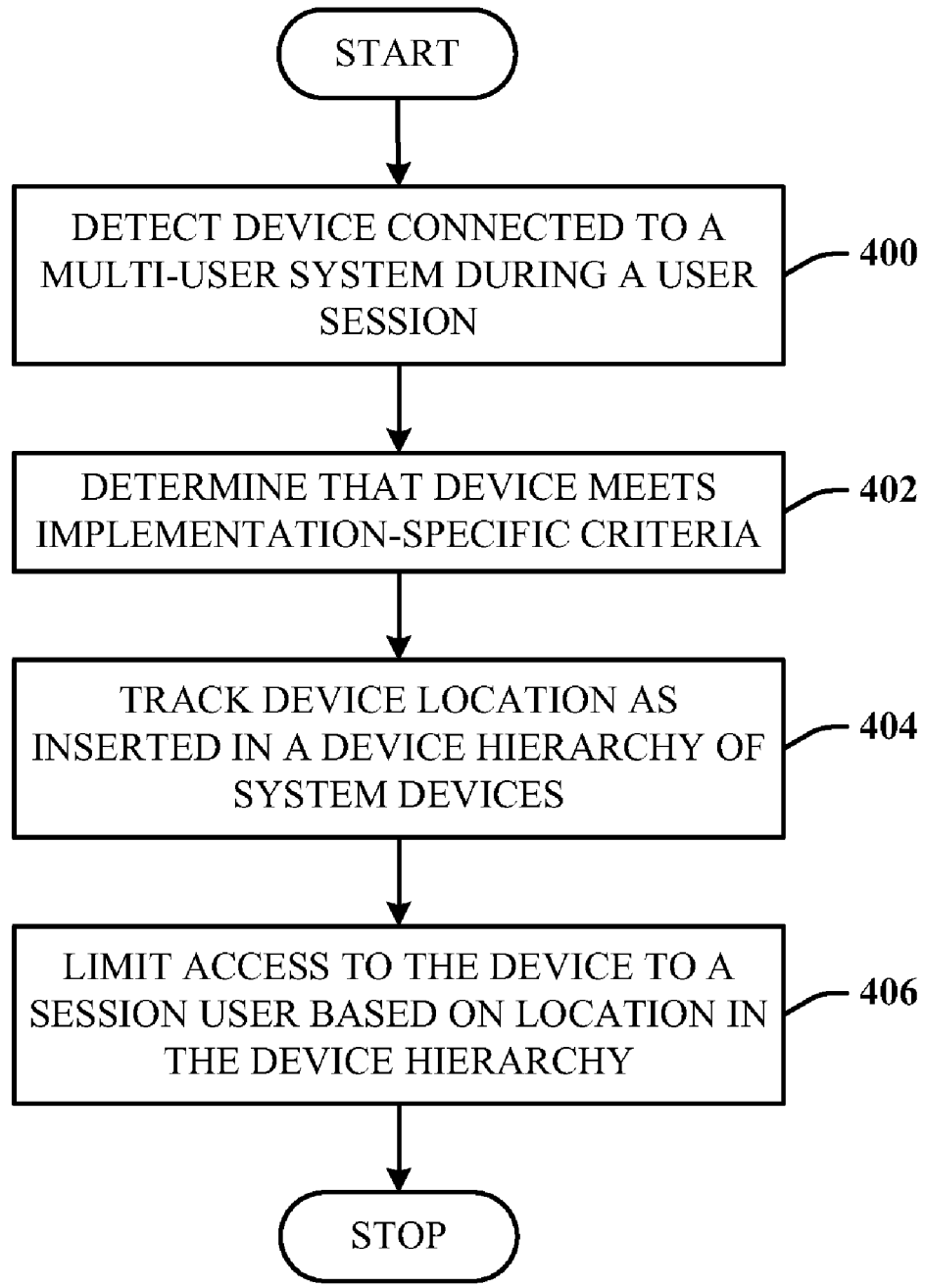
FIG. 4 illustrates a computer-implemented device management method in accordance with the disclosed architecture.

FIG. 4 illustrates a computer-implemented device management method in accordance with the disclosed architecture. At 400, a device connected to a multi-user system during a user session is detected. At 402, it is determined that the device meets implementation-specific criteria. At 404, device location is tracked as inserted in a device hierarchy of system devices. At 406, access to the device is limited to a session user based on location in the device hierarchy.

Figure 5:
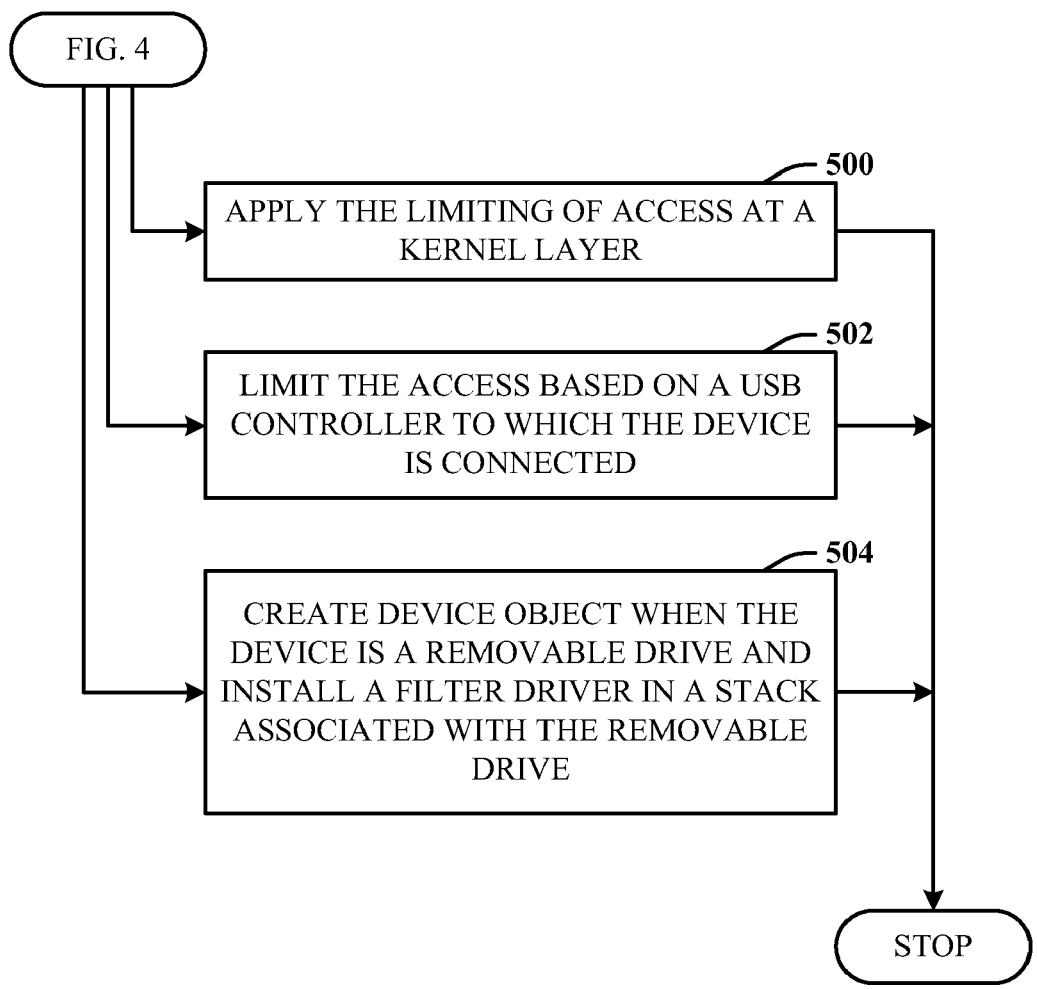
FIG. 5 illustrates further aspects of the method of FIG. 4.

FIG. 5 illustrates further aspects of the method of FIG. 4. Note that the arrowing indicates that each block represents a step that can be included, separately or in combination with other blocks as additional steps of the method represented by the flow chart of FIG. 4. At 500, the limiting of access is applied at a kernel layer. At 502, the access is limited based on a USB controller to which the device is connected. At 504, a device object is created when the device is a removable drive and a filter driver is installed in a stack associated with the removable drive.

Figure 6:
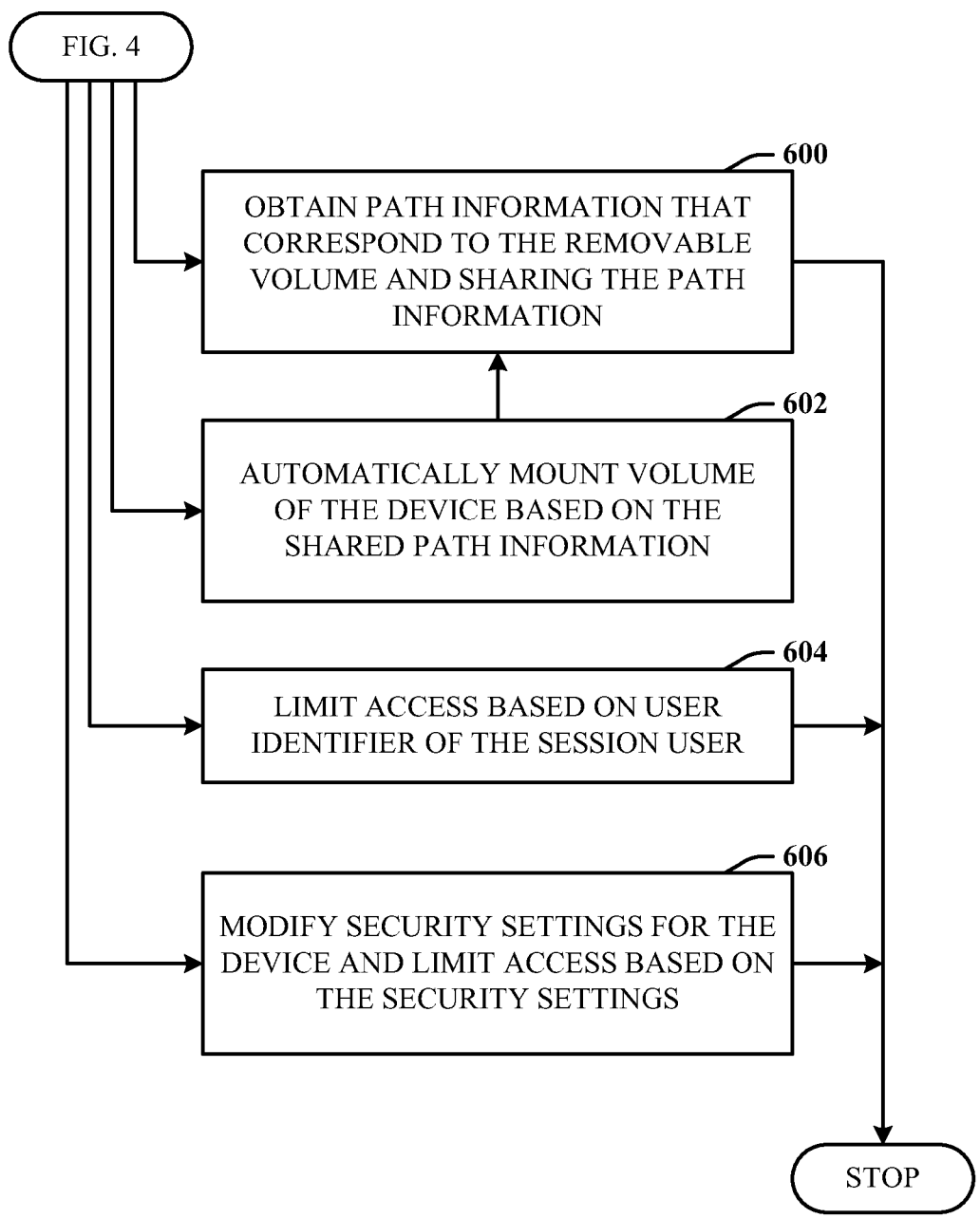
FIG. 6 illustrates further aspects of the method of FIG. 4.

FIG. 6 illustrates further aspects of the method of FIG. 4. At 600, path information is obtained that corresponds to the device and shared. At 602, a volume of the device is automatically mounted based on the shared path information. At 604, access is limited based on a user identifier of the session user. At 606, security settings are modified for the device and access limited based on the security settings.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
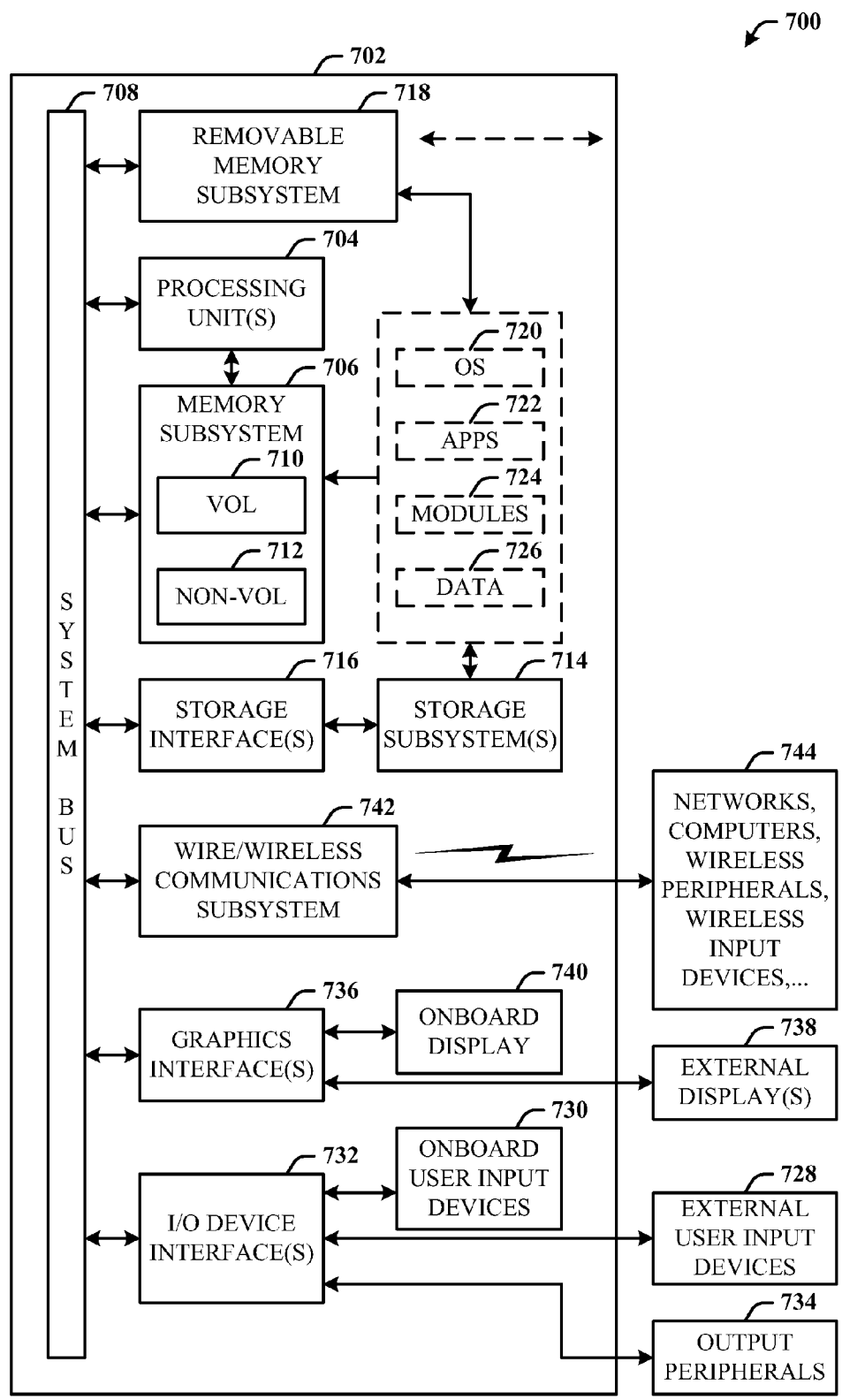
FIG. 7 illustrates a block diagram of a computing system that executes device management in accordance with the disclosed architecture.

Referring now to FIG. 7, there is illustrated a block diagram of a computing system 700 that executes device management in accordance with the disclosed architecture. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The one or more application programs 722, other program modules 724, and program data 726 can include the entities and components of the system 100 of FIG. 1, the entities and components of the system 200 of FIG. 2, the protocol diagram 300 of FIG. 3, and the methods represented by the flowcharts of FIGS. 4-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented device management system having computer readable media that store executable instructions executed by a processor, comprising:
    a management component of a multi-user system that detects install of a device during a user session, and establishes a per-session device mapping for the device relative to a device hierarchy of current device mappings of the multi-user system;
    an access component that restricts access to the device to a session user of the user session, based on a location of the device in the device hierarchy, such that only the session user can access the device; and
    a microprocessor that executes computer-executable instructions in a memory.

2. The system of claim 1, wherein the access is restricted to a single logged-in user on a station to which the device is connected.

3. The system of claim 1, wherein the device is a removable or non-removable drive.

4. The system of claim 3, wherein the drive is a universal serial bus (USB) device connected to the multi-user system via a USB hub.

5. The system of claim 1, wherein the management component prevents system software from mounting the device when the device is installed.

6. The system of claim 1, wherein the management component makes the device available to the user.

7. The system of claim 1, wherein the access component restricts access to a removable device based on location of the device in a device hierarchy of the multi-user system.

8. A computer-implemented device management system having computer readable media that store executable instructions executed by a processor, comprising:
    an management component of a multi-user system that detects install of a removable drive during a user session, and establishes a per-session mapping for the drive relative to current device mappings of the multi-user system;
    an access component that restricts access to the device to a logged-in user of the user session, the access to the device restricted based on location of the drive in a device hierarchy of current device mappings of the multi-user system, such that only the logged-in user can access the drive; and
    a microprocessor that executes computer-executable instructions in a memory.

9. The system of claim 8, wherein the access is restricted to a single logged-in user of the session during which the device is connected.

10. The system of claim 8, wherein the drive is a USB device connected to the multi-user system via a USB hub.

11. The system of claim 8, wherein the management component prevents system software from assigning a global drive letter to the device when the device is installed.

12. The system of claim 8, wherein the access component allows access based on a user identifier.

13. A computer-implemented device management method executed via a processor, comprising acts of:
  detecting a device connected to a multi-user system during a user session;
  determining that the device meets implementation-specific criteria determined to be manageable by the system;
  tracking device location as inserted in a device hierarchy of current session mappings of system devices;
  limiting access to the device to a session user based on location in the device hierarchy, such that only the session user can access the device; and
  utilizing a microprocessor that executes instructions in a memory.

14. The method of claim 13, further comprising applying the limiting of access at a kernel layer.

15. The method of claim 13, further comprising limiting the access based on a USB controller to which the device is connected.

16. The method of claim 13, further comprising creating a device object when the device is a removable drive and installing a filter driver in a stack associated with the removable drive.

17. The method of claim 13, further comprising obtaining path information that corresponds to the device and sharing the path information.

18. The method of claim 17, further comprising automatically mounting a volume of the device based on the shared path information.

19. The method of claim 13, further comprising limiting access based on a user identifier of the session user.

20. The method of claim 13, further comprising modifying security settings for the device and limiting access based on the security settings.

* * * * *